(No Model.)

R. B. AYRES.
THILL COUPLING.

No. 306,047. Patented Oct. 7, 1884.

Attest:
J. W. Riddle
John W. Voseler

Inventor:
Ruben B. Ayres by
Paul Bakewell
his attorney

N. PETERS. Photo-Lithographer, Washington, D. C.

UNITED STATES PATENT OFFICE.

RUBEN B. AYRES, OF ST. LOUIS, MISSOURI.

THILL-COUPLING.

SPECIFICATION forming part of Letters Patent No. 306,047, dated October 7, 1884.

Application filed June 25, 1884. (No model.)

*To all whom it may concern:*

Be it known that I, RUBEN B. AYRES, a citizen of the United States, residing at the city of St. Louis, in the State of Missouri, have invented a certain new and useful Improvement in Shaft-Springs, of which the following is a full, clear, and exact description, reference being had to the annexed drawings, in which—

Figure 1:
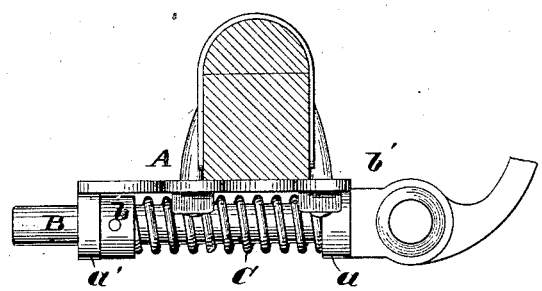
Figure 3:
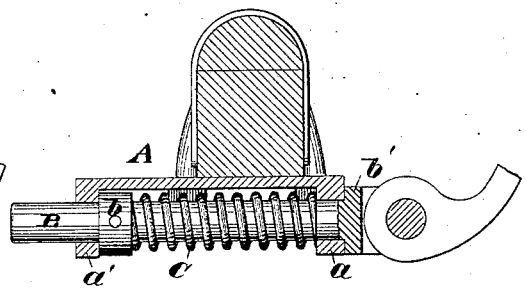
Figure 2:
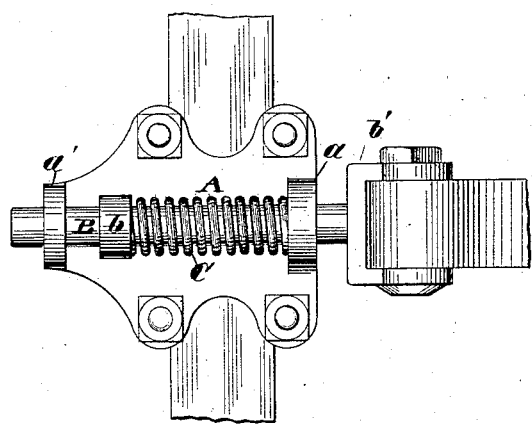
Figure 4:
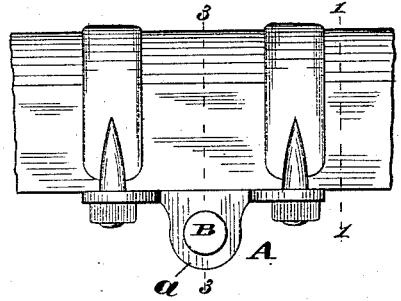

Figure 1 is a transverse vertical section of my shaft-spring as attached to axle on line 1 1 of Fig. 4; Fig. 2, bottom view of same with spring partly compressed; Fig. 3, vertical transverse section on line 3 3 of Fig. 4; Fig. 4, rear elevation of shaft-spring.

My improvement is especially adapted to light-running vehicles, those used for pleasure driving; but I do not limit its use to light-running gear.

The principal objects of my invention are to prevent a jar or jolt to those in the vehicle by giving it an easy and gradual start, and to prevent a sudden strain in starting upon the neck of the animal pulling the load, this latter advantage being one readily appreciated by all who have driven young and spirited horses, which are apt to balk and rear on feeling the strain of a sudden start.

The preferable construction of my invention is as follows: A plate, A, is attached to the front axle, on either side of the axle, about the points at which ends of shafts or pole are commonly attached to axle, preferably by means of clips, the ends of which are threaded and pass through holes in the plate A, and are fastened to and hold plate A firmly to axle by means of nuts. The clips and the manner in which they secure the plate A to the axle are clearly shown in each figure of the drawings. The plate A is provided with bearings $a$ $a'$. Journaled in these bearings $a$ $a'$ is a spindle, B, and this spindle is provided at one end with a shoulder, $b$, and at the other end with a clamp, $b'$, which clamp, together with a nut and bolt, or in any suitable manner, connects the spindle B with end of shaft, as shown in Figs. 1, 2, and 3. A spring, C, encircles the spindle B, being fixed upon spindle B between shoulder $b$ and bearing $a$, and this spring is made long enough, so that when at rest, as in Figs. 1 and 3, it will exert a continual pressure against the shoulder $b$ on one end and the bearing $a$ on the other, thus holding the shoulder $b$ firmly in position, and thus preventing rattling; and further to prevent rattling the ends of the spring can be attached by fitting into grooves, or in any suitable manner, respectively, to the bearing $a$ on one end and the shoulder $b$ on the other. The end of spindle B is made to extend out from bearing $a'$, so as to give it play, the length of such extension being at least the same as the distance between all the several coils of spring C when said spring is at rest, as shown in Figs. 1 and 3. With this device in use, a pull on the shaft will draw directly upon the spindle and compress the spring, gradually starting the vehicle, and the entire motion of the vehicle being pulled will be more elastic and easy.

I claim—

1. In a shaft-spring, the combination of a plate, A, bearings $a$ $a'$, spindle B, having a shoulder, $b$, and clamp $b'$, and spring C, substantially as described, and for the purpose specified.

2. In a shaft-spring, the combination of bearings $a$ $a'$, spindle B, having a shoulder, $b$, and clip $b'$, and spring C, substantially as described, and for the purpose specified.

In testimony whereof I affix my signature, in presence of two witnesses, this 11th day of June, 1884.

RUBEN B. AYRES.

Witnesses:
PAUL BAKEWELL,
KERNANDO SAUTER.